A. M. VEDOE.
PACKING FOR PISTONS AND THE LIKE.
APPLICATION FILED JAN. 18, 1915.
1,172,646.
Patented Feb. 22, 1916.
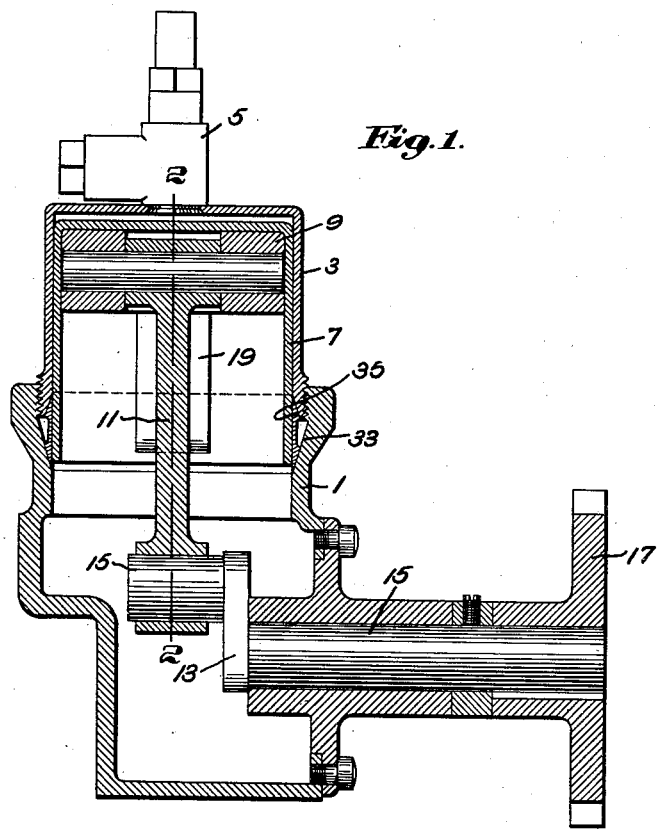
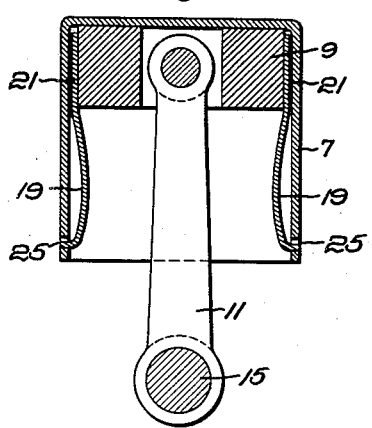
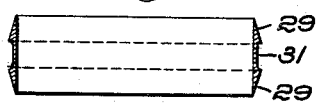
Witnesses:
Horace A. Crossman
Edward W. Baker
Inventor:
Anton M. Vedoe.
by Emery, Booth, Janney & Varney
Attys

UNITED STATES PATENT OFFICE.

ANTON M. VEDOE, OF EVERETT, MASSACHUSETTS, ASSIGNOR TO BAY STATE PUMP CO., OF BOSTON, MASSACHUSETTS, A CORPORATION OF MASSACHUSETTS.

PACKING FOR PISTONS AND THE LIKE.

1,172,646.  Specification of Letters Patent.  Patented Feb. 22, 1916.

Application filed January 18, 1915. Serial No. 2,798.

*To all whom it may concern:*

Be it known that I, ANTON M. VEDOE, a subject of the King of Sweden, and a resident of Everett, county of Middlesex, and State of Massachusetts, have invented an Improvement in Packing for Pistons and the like, of which the following description, in connection with the accompanying drawings, is a specification, like characters on the drawings representing like parts.

This invention relates to packings for the pistons of pumps, engines and other devices, and among other objects aims to provide a simple and effective packing construction for preventing leakage between a cylinder and its piston.

The character of the invention can be best understood by reference to the following description of an illustrative embodiment thereof shown in the accompanying drawing, wherein:

Figure 1 is a vertical section through an illustrative pump shown herein as equipped with a packing construction embodying the invention; Fig. 2 is a vertical section taken on the broken line 2—2 of Fig. 1; Fig. 3 is a detail of the packing ring; and Fig. 4 is a transverse section through the ring shown in Fig. 2.

Referring to the drawing, the illustrative construction shown therein as embodying the invention, comprises a casing 1 formed to present part of a cylinder. The upper part of the cylinder is in the form of a cap 3 threaded to said casing. A portion of this cap may be knurled to facilitate the securing thereof to said casing. The cap is provided with a fixture 5 containing usual inlet and discharge valves unnecessary to show herein.

Mounted within the cylinder is a piston 7 adapted to reciprocate therein past the union of the two parts of the cylinder. This piston preferably is made in cup form in which may be inserted a head 9 pivotally connected to one end of a rod 11, the opposite end of which is connected to a crank 13 on a shaft 15 journaled in a bearing in the casing 1 referred to. This shaft projects beyond said casing and may be provided with a pinion 17 driven in any suitable manner.

For convenience of assembly, the rod head 9 may be detachably connected to the cup piston. To accomplish this opposed springs 19 are provided having reduced ends adapted to seat in recesses 21 in said head, and lugs 25 adapted to be sprung into the wall of said piston from the interior thereof. When these springs are snapped in place they effectively hold the head securely in said piston.

An important feature of the invention relates to a packing construction for preventing leakage between the cylinder and the piston. To accomplish this a packing ring 27 is provided of Babbitt metal or other appropriate material formed to present sharp beveled end portions 29 and a groove 31 between said portions. This ring, unlike usual packing rings, is formed in a continuous circle without interruption. The ring is located substantially at the juncture between the cylindrical portion of the casing 1 and the cylindrical cap 3. The casing is formed to present a tapered seat 33 to receive the lower beveled end of the ring, and the cap is formed to present a tapered portion 35 for engagement with the upper tapered end of said ring. The taper of the seats 33 and 35 is preferably at a somewhat sharper pitched angle than that of the bevel ends 29 of the ring.

When the cap 3 is screwed down into the casing 1, the seats 33 and 35 will press the beveled ends of the ring into intimate engagement with the piston and prevent any possibility of leakage between them. This compression of the ends of the ring toward one another, tends to bulge the web or thin portion of the ring opposite the groove 31 circumferentially inwardly into intimate contact with the piston, which further contributes to the prevention of leakage between the cylinder and the piston. In fact, the construction and arrangement is such that substantially the entire inner surface of the packing ring is pressed into intimate engagement with the piston. Attention is called to the fact that the packing ring being of Babbitt or equivalent metal, is readily flexible and compressible and thereby will respond to the tightening effect produced by the screwing of the cap into the casing, and will be pressed against said piston throughout the entire circumference of the ring, and thereby prevent any possibility of leakage.

While the ring is shown herein as provided with both ends beveled, it will be understood that in some cases one end alone might be beveled, if desired.

Having thus described one illustrative embodiment of the invention without limiting the same thereto, what I claim as new and desire to secure by Letters Patent, is:—

1. A packing ring comprising end portions and a circumferentially continuous thin web portion intermediate said end portions having provision permitting the same to contract and bulge circumferentially inward on compression of said end portions toward one another.

2. A packing ring of Babbitt metal comprising end portions and a circumferentially continuous web portion thinner than said end portions and having provision permitting the same to contract inward on compression of said end portions toward one another.

3. A packing ring uninterrupted throughout its circumference comprising end portions and a relatively thin web portion intermediate said end portions having provision permitting the same to bulge circumferentially into light yielding engagement with a reciprocating element on compression of said end portions toward one another.

4. The combination of a reciprocable element with a packing ring comprising end portions and a relatively thin, circumferentially continuous web portion intermediate said end portions having provision permitting the same to bulge circumferentially into light yielding engagement with the reciprocating element on compression of said end portions toward one another in the direction of the axis of the ring, said ring being of a material softer than said element.

5. A packing ring comprising a thin end portion provided with a sharp circumferentially continuous edge, and a thin web intermediate the ends of the ring, said edge having provision permitting the same to contract circumferentially inward on compression of said ends toward one another.

6. A packing ring comprising end portions having sharp circumferentially continuous edges and a thin web portion intermediate said end portions, said edges having provision permitting the contracting thereof inward on compression of said end portions toward one another.

7. The combination with cylinder members of a reciprocating element, and a packing ring for the latter comprising end portions and a circumferentially continuous web portion intermediate said end portions having provision permitting the same to contract circumferentially inward into intimate engagement with said reciprocating element on compression of said end portions toward one another.

8. The combination with a cylinder of a casing, a reciprocating element therein, and a packing ring located between said cylinder and casing comprising end portions and a circumferentially continuous thin web portion intermediate said end portions having provision permitting the same to contract circumferentially inward into intimate engagement with said reciprocating element on relative axial adjustment of said cylinder and casing.

9. The combination of a cylinder 3 with a casing 1 directly threaded together and having opposed seats 35 and 33, a reciprocating element, and a packing ring 27 confined between said seats comprising end portions 29 and a circumferentially continuous web portion 31 having provision permitting the same to contract circumferentially inward on rotative adjustment of said cylinder bodily relatively to said casing.

10. A packing ring comprising tapering end portions and a circumferentially continuous web portion thinner than said end portions and having provision permitting the same to contract inward on compression of said end portions toward one another.

In testimony whereof, I have signed my name to this specification, in the presence of two subscribing witnesses.

ANTON M. VEDOE.

Witnesses:
ROBERT H. KAMMLER,
HENRY T. WILLIAMS.